June 14, 1960   W. R. SMITH ET AL   2,940,312
WORK MEASURING DEVICE PARTICULARLY ADAPTED TO
DETECTING VERY SMALL AND RAPID MOVEMENTS
Filed Oct. 10, 1955   3 Sheets-Sheet 3

INVENTORS
WILLIAM R. SMITH
CHESTER C. SPERRY
BY
ATTORNEY

United States Patent Office 2,940,312
Patented June 14, 1960

2,940,312

WORK MEASURING DEVICE PARTICULARLY ADAPTED TO DETECTING VERY SMALL AND RAPID MOVEMENTS

William Ralph Smith and Chester C. Sperry, Kalamazoo, Mich., assignors to The Upjohn Company, Kalamazoo, Mich., a corporation of Michigan Filed Oct. 10, 1955, Ser. No. 539,342

5 Claims. (Cl. 73—379)

This invention relates to a work measuring device and it relates particularly to a type of work measuring device adaptable for measuring mechanical movements of very small magnitude especially wherein such movements are caused by the application of relatively weak and/or rapidly occurring forces.

In the pharmaceutical industry, a great deal of experimental work is carried out by the use of various types of test animals, such as rats, wherein different kinds of operations are performed on a given test animal and its muscular reaction is then measured. One method for testing such muscular reaction, which method has for many years been accepted as standard in the industry, is to fasten one end of a cord onto a part, as the leg or in a muscle, of a test animal. The cord is then wrapped around a rotatable drum and its other end is affixed to a weight. A mechanical, accumulative type, counter is attached to the drum for registering the total rotation of the drum in a direction corresponding to a lifting of the weight. By thus measuring the total distance through which the test animal lifts the weight, a determination can be made of the total amount of the mechanical work done by the test animal under the conditions of the test.

However, many of the movements of the test animal are of very small magnitude and many of them involve only a relatively weak movement of the animal's muscles. This is particularly true near the end of an experiment where a given test animal is approaching immobility and reactions which were formerly strong and positive are becoming weak and small. Thus, to secure a complete measurement of the total amount of work done by the animal in a given test period it becomes essential to measure not only the strong movements which occur through a substantial amplitude but also to measure the weak movements which occur only through a small amplitude.

A different, but related, phase of the problem appears when the motions to be measured are of rapidly occurring and/or repeating character. For example, in some types of experimental work, the cord is attached directly to the muscle in a rat's leg and the muscle is then activated by a series of rapidly repeating electrical shocks. It often happens in a mechanical counter, that the inertia of the counter makes it difficult for the counter to respond rapidly enough to the rapid motions of the test animal to be as accurate as desired.

Still further, with many types of mechanical counters, their recording movement with respect to each count originates from a zero point which is fixed for any given adjustment of the counter. Thus, the part of the test animal whose movement is being measured must be positioned at a zero point corresponding to the zero point of the counter. This works well enough during the initial phases of an experiment, but even where the conditions of the experiment are highly controlled, as where the sole activation of the rat's muscle is in response to electric shocks, such muscle is likely to stretch, or otherwise move away from the preselected zero point, during the course of the experiment. When this happens, a certain amount of movement may take place between its stretched position, which amounts to a new zero point for the muscle under test, and the zero point of the counter without registering any movement on the counter. This failure to register an actual movement of the test animal further renders the results of the test inaccurate.

Another problem present in previously known devices, particularly where a ratchet and pawl are involved, is the mechanical friction which is equivalent to a force acting against the movement of the test animal, but this force is not readily measurable and thus introduces inaccuracies into the test results.

A further phase of the friction problem arises from the fact that the movements of the test animal are often spasmodic and unpredictable. In many types of mechanical devices, the measuring mechanism will respond to the frictional drag differently at different times depending on the frequency and length of the animal's movements. Hence, with irregular and spasmodic movements, it becomes entirely impossible to predict or measure the frictional force with any degree of accuracy.

Many attempts have been made to provide various types of counters having a minimum of friction. These diminish the inaccuracies attributable to friction within the measuring device but a substantial amount of friction still remains, even in the most delicately bearinged instruments, and constitutes a source of substantial inaccuracy.

It is, therefore, a principal object of the present invention to provide a work measuring device capable of measuring movements of very small magnitude and which will respond to the application of very small forces.

A further object of the invention is to provide a device, as aforesaid, which will respond to forces, even small forces, applied very quickly and/or at a very rapidly repeating rate.

A further object of the invention is to provide a device, as aforesaid, which will measure such movements with a high degree of accuracy.

A further object of the invention is to provide a device which will be reliable in operation, easy to handle and economical in both original construction and maintenance.

A further object of the invention is to provide a device which will be versatile in its application to many different types of test animals and over a wide range of work measuring requirements.

A further object of the invention is to provide a device which has only a single lightweight shaft and a disk carried thereby as its mechanically movable parts and hence diminishes friction and inertia to a value much less than is attainable in any previously known mechanical work measuring device.

A further object of the invention is to provide a device, as aforesaid, in which the friction of a pawl against a ratchet is eliminated.

A further object of the invention is to provide a device, as aforesaid, in which the actual work measuring is carried out by opto-electrical means which are independently energized and hence does not absorb energy from a test animal for its internal operation.

Other objects and purposes of the invention will be apparent to persons acquainted with apparatus of this general type upon a reading of the following disclosure and inspection of the accompanying drawings.

Figure 5:
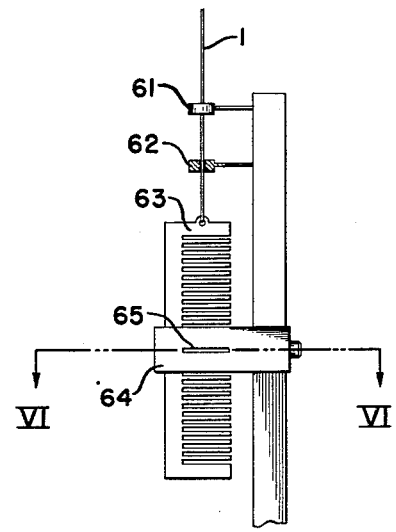

Figure 5 fragmentarily illustrates a modification.

Figure 6:
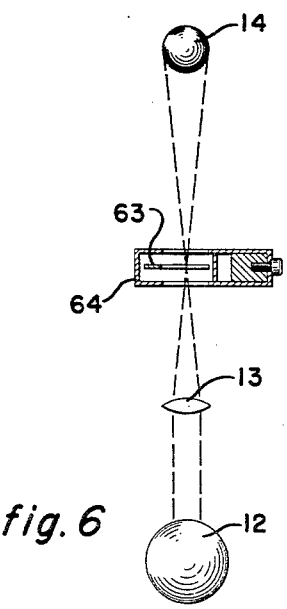

Figure 6 is a sectional view taken on line VI—VI of Figure 5.

In general

In general, our invention comprises supporting a light chopping device for movement in response to, and in proportion to, the mechanical work to be measured. A disk of very low mass may be placed on a single shaft which shaft is adapted to be rotated freely in response to the application of extremely minute forces. A beam of light is caused to fall upon the light chopping device and segments of light passing therethrough are proportional in number to the movement of the light chopper and are directed to fall upon a photocell. The output of the photocell is a series of pulses corresponding in number to the light segments. These are amplified and fed to a counter. Thus, the counter will react rapidly and accurately to the segments of light falling upon the photocell and the total number of said segments of light will be an accurate measure of the amount of mechanical work done by the test animal.

Detailed description

Figure 1:
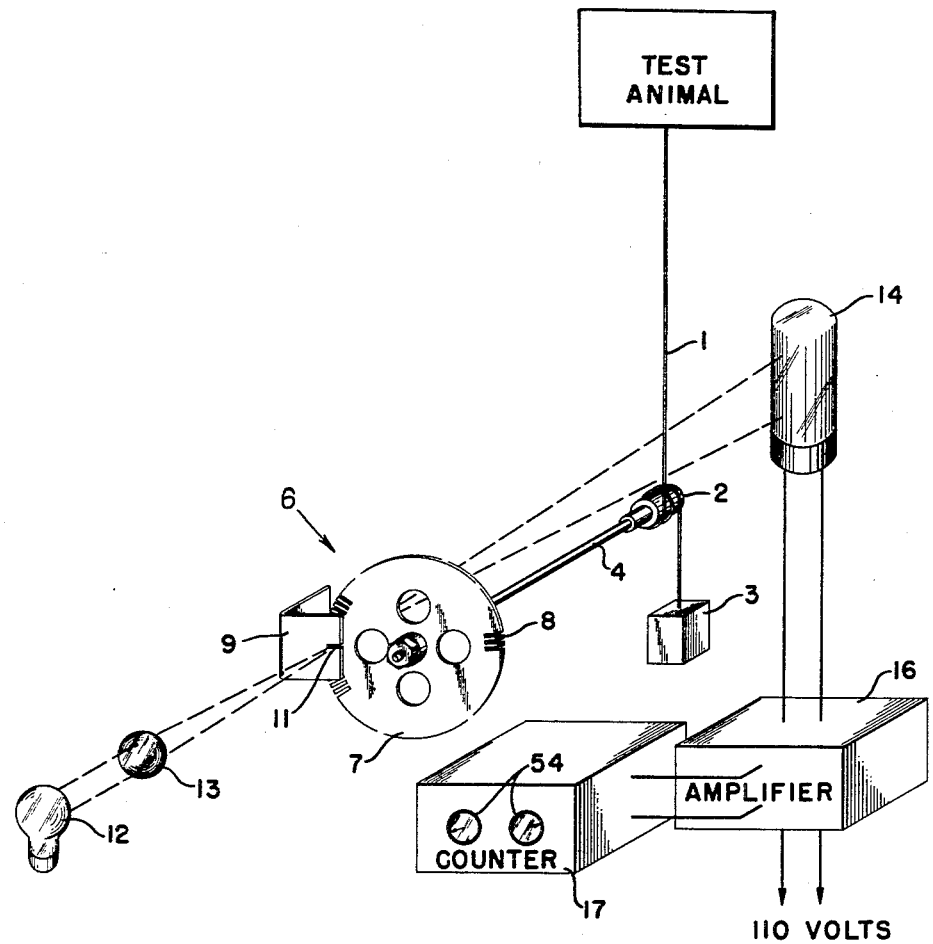
Figure 1 is a diagrammatic representation of the device of our invention.

Referring now to the drawings in more detail, there is shown in Figure 1 a test animal, here a rat, indicated by the letter A, having a cord 1 attached to a foot of the animal and extending downwardly to wrap around the drum 2 and thence to a weight 3. This arrangement is conventional in present testing apparatus and the drum 2 normally drives a mechanical counter registering the number of times movement of the rat's foot raises the weight 3, and the distance that the weight 3 is raised by each of such movements. In this manner, the total distance that the rat lifts the weight is measured and the mechanical work accomplished by the rat during the test is thereby computed.

In the present device, the drum 2 drives a shaft 4 which in turn rotates a light chopper 6. Said light chopper 6 consists of a disk 7 which is provided with a series of closely spaced, radially directed slots 8 arranged in a circle on the disk and spaced from the center thereof, here on the periphery of the disk 7. A light control member 9 is provided with a control slot 11 with which the slots 8 successively become aligned as the disk 7 rotates. The light source 12 is positioned to direct a beam of light through a lens 13, thence through the slot 11 and through one of the slots 8 to a photo tube 14. The output of the photo tube is fed to an amplifier 16 and the output of the amplifier is supplied to a counter 17, said counter being provided with count registering dials 54 of any convenient form.

Figure 2:
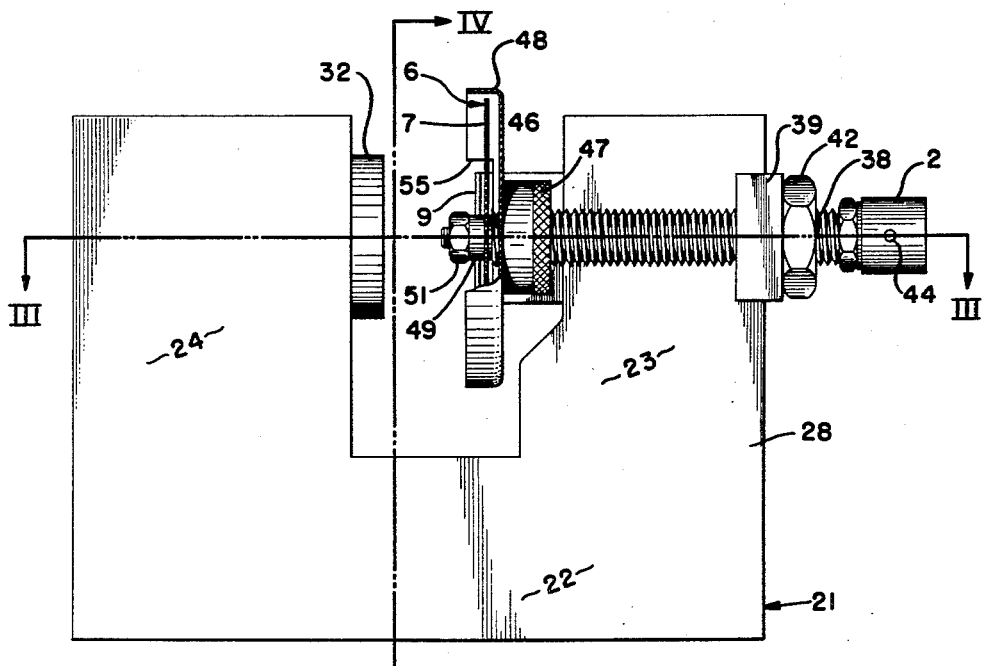
Figure 2 is a side view of the portion of the device converting mechanical movement of the test animal into measurable electric pulses.
Figure 3:
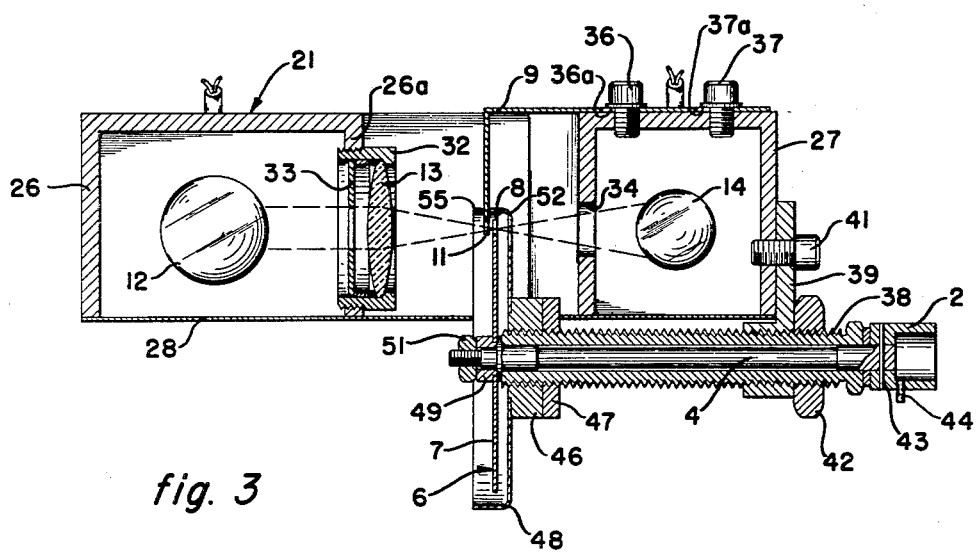
Figure 3 is a sectional view taken on the line III—III of Figure 2.
Figure 4:
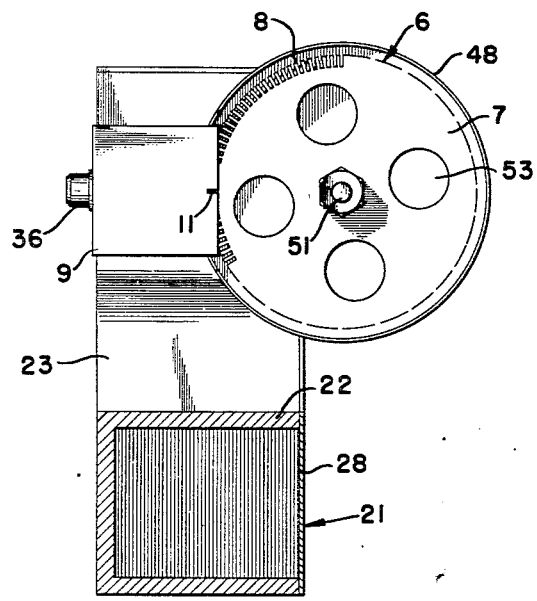
Figure 4 is a sectional view taken on the line IV—IV of Figure 2.

Turning now to further details of the mechanism including the light chopper 6, attention is directed to Figures 2, 3 and 4. In these figures there is shown a base member 21 which is of generally U-shape having a lower portion 22 and a pair of upstanding sections 23 and 24. These sections are here composed of a suitable casing of substantially U-shaped cross-section, such as indicated at 26 and 27 in Figure 3. The U-shaped cross-section is closed by a plate 28. The U-shaped section 26 has mounted therein in any convenient manner the light source 12. Associated with the light source 12 is the lens 13 mounted into the right hand wall 26a of the section 26 by the barrel 32. A light shield 33 is provided to control the size of the light beam striking the lens 13.

The U-shaped section 27 contains the photo tube 14 aligned with the light source 12 and the lens 13. An opening 34 permits entry of the light beam into the section 27 to reach the photo tube 14. The shaft 4 is supported in an elongated bushing 38, preferably of antifriction material, and said bushing is in turn supported in and by a bracket 39 which is fastened to the section 27 in any convenient manner, as by the screw 41. The external threading of the bushing 38 permits axial adjustment thereof with respect to the frame of the device and thereby permits accurate positioning of the disk 7 with respect to the light source 12 and the lens 13 in order to locate said disk at the focal point of the lens 13. A nut 42 acts as a lock nut to hold the bushing 38 rigid, and firmly in its adjusted position, with respect to the bracket 39.

The control shield 9 is fastened to the rear side of the section 27 in any convenient manner, as by the screws 36 and 37. Cap screws 36 and 37 extend through the slots 36a and 37a in the shield 9, respectively, in order to provide for adjustment of said shield 9 toward and away from the disk 7 in a direction parallel to the axis connecting the center of the source 12 with the target of the photocell 14. In this manner, the shield may be placed as close as possible to the disk 7 in order to assist in obtaining sharp definition of the beam to be cut by the slots 8 in said disk.

The drum 2, preferably hollow to minimize weight, is mounted at the end of the shaft and is fixed nonrotatably with respect thereto by a pin 43. A further pin 44 is provided for fastening the string 1 firmly with respect to the drum 2. The drum 2 is of substantially smaller diameter than disk 7 to provide high sensitivity of the work measuring device to movement of a selected portion of the test animal.

Adjacent the other end of the shaft 4 there is provided a collar 46 held firmly in place on the bushing 38 by a lock nut 47. A disk shield 48 is firmly mounted, as by welding, onto the collar 46.

The light chopper disk 7 is of any lightweight material, as aluminum. It is affixed to the shaft 4 adjacent the end thereof and is held firmly in place by a spacer 49 and a nut 51. An opening 52 is provided in the rear wall of the disk shield 48 to permit light to pass from the slots 8 to and through the opening 34 to the photocell 14. There is also an opening 55 in the side wall of the disk shield 48 adjacent the control shield 9 by which said shield 9 is enabled to extend into the space defined by the disk shield 48 and into alignment in the path of the beam with the slots 8 in the disk 7.

The disk 7 is preferably provided with openings 53 to further reduce the weight thereof and thereby reduce its inertia.

Operation

The operation will probably be evident from the description already set forth but will be reviewed in the interest of completeness.

By making the disk 7 of aluminum, or other lightweight material, by making the bearings of the shaft 4 as nearly frictionless as possible, and by hollowing the drum 2, it will be recognized that both the inertia and the friction of the rotating parts will be reduced to a minimum. Thus, even an extremely weak movement of the leg of the rat A will cause a movement of the disk 7, and only an extremely minute portion of the energy expended by the rat will be absorbed in overcoming inertia and/or in overcoming friction.

The device is adjusted by rotation of the bushing 38 to place the disk 7 so that the slots 8 will cut the light beam at the focal point of the lens 13. The lock nut 42 is then adjusted to hold the bushing 38 firmly in place. The shield 9 is next adjusted to bring the portion thereof containing the control slot 11 as close as possible to the disk 7 but without in any way interfering with its movement or touching it. The cord 1 is wrapped around the drum 2, affixed as convenient to the pin 44 and one end is fastened to the weight 3. As is conventional practice, the other end of the cord 1 may be attached either to the leg of the animal or it may be attached directly to a selected muscle, as a leg muscle, of the test animal. The beam source 12 is energized and the electrical circuit including and connecting the photocell 14 and the counter 17 is energized.

With the parts so arranged, any movement of the leg or muscle of the test animal to which the cord 1 is attached which results in an upward or downward movement of the weight 3 will effect a rotation of the disk 7. This will cause a chopping of the light beam emanating from the source 12 and passing through the control slot 11 and will cause a succession of light segments to fall upon the photocell 14. This will cause a succession of corresponding electrical pulses to be fed first to the amplifier and then, as amplified, to the counter and thereby counted in any conventional manner. The counting is only of the number of such pulses and not of their duration or rapidity. Thus, the count as registered on the dials 54 of the counter will indicate the number of slots 8 passing the control slot 11 and this will be directly proportional to the total distance through which the test animal moves the weight 3. Because of the relatively large angular movement of the portion of the disk occupied by the peripheral slots 8 as compared to the angular movement of the surface of the drum 2, the movement of the surface of the drum being equal to the lineal movement at any given time of the weight 3, and because of the very small angular extent of each of the slots 8, it will be appreciated that even an extremely small vertical movement of the weight 3 will cause at least one of the peripheral slots 8 to move past the control slot 11. Thus, even a movement of the weight 3 which is not visible to the eye will be detected and recorded by the equipment.

Similarly, due to the extremely low inertia of the mechanical parts here involved, very rapid movements of the muscle of the test animal will be accurately reflected by movements of the disk 7 and any movement of the disk 7 will be recorded immediately and accurately by the electrical system actuating the counter 17.

Particularly, since any movement of the disk 7 will record accurately in response to the number of peripheral slots 8 which pass the control slot 11, regardless of the point of said disk from which movement is started, this device will continue to record rapidly even when the muscles of the test animal have stretched and the low position of the weight 3, that is, the relaxed position of the muscle between contractions, has actually shifted. Thus, neither fatigue of the animal or stretching of the muscle will introduce any inaccuracy into the test results.

*Modification*

Figure 5 illustrates a modification utilizing certain of the broad principles of the invention above described but employing quite materially different apparatus. Here the string 1 from the test animal is led through a pair of guiding, low friction, eyelets 61 and 62 and the weight 3 is replaced by a comb 63, itself constituting the weight against which the test animal works. The comb 63 is held and guided within a bracket 64, preferably so that it does not touch any portion of said bracket but, will rather hang substantially freely therewithin. A control slot 65, corresponding in function to the control slot 11, is provided in the bracket 64. Thus, as the test animal moves the cord 1 is moved in the same manner as is the case in connection with the structure shown in Figures 1 to 4 inclusive and the comb 63 is caused to move upwardly or downwardly. This will cut the light beam passing through the control slot 65 and cause segments of light to fall onto the photo-sensitive device 14 in the same manner as is the case in connection with Figures 1 to 4 inclusive. The output of photo-sensitive device 14 is then conducted to an amplifier and to a counter as before.

This modification of the device has the disadvantage that the movement of the comb is only equal to the movement of the cord and hence it will require extremely fine teeth in the comb to make the device sensitive to small movements of the test animal's foot but, on the other hand, there is here present not even the light frictional load existing in connection with the shaft 4 of the structure of Figures 1 to 4 and hence there will be no inaccuracy at all resulting therefrom.

While specific embodiments of the invention have been shown to illustrate the principle thereof, it will be recognized that many other variations may be made from the specific structure here shown and that accordingly the hereinafter appended claims should be interpreted as including such variations excepting as said claims may by their own terms expressly require otherwise.

We claim:

1. A device for accumulatively measuring the total mechanical work performed by a test animal during a predetermined test period, the combination comprising: a vertically positioned cord, the upper end thereof being adapted for attachment to said test animal and means providing a constant force pulling away from said test animal at the other end of said cord; a drum mounted on a shaft and interposed between the ends of said cord, a portion of said cord being wrapped around said drum so that said drum will rotate in response to axial movement of said cord; a light chopping disk mounted for rotation on said shaft so that said disk will rotate in exact response to the rotation of said drum; a source of illumination positioned on one side of said disk and a light sensitive device positioned on the other side of said disk whereby rotative movement of said disk will segmentize the light passing from said source to said device, the number of said segments striking said device thereby being exactly proportional to the axial movement of said cord; a counter responsive to the electric output of said device and arranged for recording the total number of such segments occurring during said test period.

2. A unit for use in measuring the mechanical work done by a test animal, the combination comprising: a generally U-shaped hollow frame member; a source of illumination positioned within one leg of said U and a light sensitive device positioned in the other leg of said U; openings in the mutually adjacent sides of said legs positioned for permitting the passage of a light beam from said source to said device, a lens mounted within the adjacent side of said one leg and aligned with said illumination source, the focal point of said lens being located between said adjacent sides; a shaft rotatably supported on one leg of said frame and means supporting said shaft for movement toward and away from said lens; a slotted light chopping disk supported on said shaft between said legs in such position that its slots will cut a light beam passing from said source to said device; a drum fixedly mounted on said shaft and adapted for rotation in response to movement of said test animal to thereby effect corresponding rotation of said shaft and said disk; a cord adapted to be affixed at one end thereof to a portion of the test animal, an intermediate portion of said cord being wound around said drum; and means connected to the other end of said cord for exerting a constant pulling force thereon.

3. A device defined in claim 2 wherein said disk and said drum are mounted on a common shaft and including an externally threaded bushing for supporting said shaft, a bracket and lock nut threadedly engaging said bushing and mounted on said frame.

4. The device defined in claim 2 including a light shield having a control slot therein positioned in front of the disk and means mounting the light shield onto said frame.

5. The device defined in claim 2 including a cup shaped disk shield around said disk, an opening through said shield permitting passage of said beam of light therethrough; a further opening in the flange of said cup shaped shield permitting entry thereinto of the hereinafter mentioned light control shield, and a light control shield mounted on said frame entering through said last named opening into said disk shield and having a control slot therein positioned within the path of the beam of light in alignment with the slots of said disk.

References Cited in the file of this patent

UNITED STATES PATENTS

| | | |
|---|---|---|
| 2,136,223 | Thomas | Nov. 8, 1938 |
| 2,342,605 | Snyder | Feb. 22, 1944 |
| 2,428,990 | Rajchman | Oct. 14, 1947 |
| 2,470,926 | Gieseke | May 24, 1949 |
| 2,605,695 | Campbell | Aug. 5, 1952 |